United States Patent
Smith et al.

(10) Patent No.: US 12,294,626 B2
(45) Date of Patent: *May 6, 2025

(54) SYSTEM AND METHOD FOR DISTRIBUTED CACHING

(71) Applicant: Samsung Electronics Co., Ltd., Suwon-si (KR)

(72) Inventors: Hubbert Smith, San Jose, CA (US); Vikas Sinha, Sunnyvale, CA (US)

(73) Assignee: Samsung Electronics Co., Ltd., Yongin-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/706,373

(22) Filed: Mar. 28, 2022

(65) Prior Publication Data

US 2022/0217207 A1 Jul. 7, 2022

Related U.S. Application Data

(63) Continuation of application No. 16/904,448, filed on Jun. 17, 2020, now Pat. No. 11,290,535, which is a
(Continued)

(51) Int. Cl.
*G06F 15/167* (2006.01)
*H04L 9/40* (2022.01)
(Continued)

(52) U.S. Cl.
CPC ........ *H04L 67/1097* (2013.01); *H04L 63/101* (2013.01); *H04L 65/1063* (2013.01); *H04L 67/55* (2022.05); *H04L 67/568* (2022.05)

(58) Field of Classification Search
CPC ............... H04L 63/101; H04L 65/1063; H04L 67/1097; H04L 67/55; H04L 67/568; H04L 63/0428; G06F 12/0866; G06F 2212/214

See application file for complete search history.

(56) References Cited

U.S. PATENT DOCUMENTS 5,964,835 A 10/1999 Fowler et al.
7,280,536 B2 10/2007 Testardi
(Continued)

FOREIGN PATENT DOCUMENTS

| CN | 103699496 A | 4/2014 |
| JP | 2016-046785 | 4/2016 |

(Continued)

OTHER PUBLICATIONS

U.S. Office Action dated Nov. 21, 2019, issued in U.S. Appl. No. 15/921,568, (28 pages).
(Continued)

*Primary Examiner* — Dustin Nguyen
*Assistant Examiner* — Hao H Nguyen
(74) *Attorney, Agent, or Firm* — Lewis Roca Rothgerber Christie LLP

(57) ABSTRACT

A system and method for distributed caching, the system having at least one network-connected storage device, a content server, and a control server. The control server is configured to discover the at least one network-connected storage device, collect device information from the at least one network-connected storage device, where the device information comprises a device location, assign each of the at least one network-connected storage device to a device domain based on each device location, and provide the content server with the device information for the one or more network-connected storage.

20 Claims, 10 Drawing Sheets

Related U.S. Application Data continuation of application No. 15/921,568, filed on Mar. 14, 2018, now Pat. No. 10,728,332.

(60) Provisional application No. 62/610,036, filed on Dec. 22, 2017, provisional application No. 62/609,948, filed on Dec. 22, 2017.

(51) Int. Cl.
*H04L 65/1063* (2022.01)
*H04L 67/1097* (2022.01)
*H04L 67/55* (2022.01)
*H04L 67/568* (2022.01)

(56) References Cited

U.S. PATENT DOCUMENTS

| | | | |
|---|---|---|---|
| 7,624,109 B2 | 11/2009 | Testardi | |
| 7,890,656 B2 | 2/2011 | Nakamichi et al. | |
| 7,945,643 B2 | 5/2011 | Hanes | |
| 8,422,641 B2 | 4/2013 | Martin, II | |
| 8,473,596 B2 * | 6/2013 | Tsao | H04L 67/02 709/223 |
| 8,677,091 B2 | 3/2014 | Littlefield et al. | |
| 8,881,132 B2 * | 11/2014 | Mopur | G06F 3/0632 717/176 |
| 9,069,790 B2 | 6/2015 | Lord | |
| 9,088,457 B1 | 7/2015 | Johnson | |
| 9,304,828 B2 | 4/2016 | Nakajima et al. | |
| 9,326,261 B2 | 4/2016 | Wei | |
| 9,329,801 B1 | 5/2016 | Byrd et al. | |
| 9,342,526 B2 | 5/2016 | Bolik et al. | |
| 9,509,718 B1 | 11/2016 | Arthur et al. | |
| 9,772,866 B1 | 9/2017 | Aron et al. | |
| 10,289,309 B2 | 5/2019 | Tsalmon et al. | |
| 10,915,347 B1 | 2/2021 | Per et al. | |
| 2002/0053029 A1 | 5/2002 | Nakamura et al. | |
| 2002/0161767 A1 | 10/2002 | Shapiro et al. | |
| 2003/0023738 A1 | 1/2003 | Boivie et al. | |
| 2003/0158998 A1 | 8/2003 | Smith | |
| 2004/0010617 A1 | 1/2004 | Akahane et al. | |
| 2010/0082678 A1 * | 4/2010 | Baier | H04L 63/0428 707/783 |
| 2010/0312809 A1 | 12/2010 | Calder et al. | |
| 2011/0066808 A1 * | 3/2011 | Flynn | G06F 12/0246 711/E12.001 |
| 2011/0302320 A1 * | 12/2011 | Dunstan | H04L 12/185 370/252 |
| 2012/0124092 A1 | 5/2012 | Teranishi et al. | |
| 2013/0132544 A1 | 5/2013 | Krishnan et al. | |
| 2013/0191590 A1 * | 7/2013 | Malwankar | G06F 13/1668 711/E12.019 |
| 2013/0198636 A1 | 8/2013 | Kief et al. | |
| 2013/0262392 A1 | 10/2013 | Vibhor et al. | |
| 2014/0164547 A1 | 6/2014 | Fullagar et al. | |
| 2014/0215152 A1 * | 7/2014 | Cheng | H04N 21/2405 711/114 |
| 2014/0289833 A1 | 9/2014 | Briceno et al. | |
| 2015/0058441 A1 | 2/2015 | Weizman et al. | |
| 2016/0154403 A1 | 6/2016 | Arbogast | |
| 2016/0285882 A1 * | 9/2016 | Brunn | H04L 63/061 |
| 2016/0294971 A1 * | 10/2016 | Li | H04L 47/125 |
| 2016/0306579 A1 | 10/2016 | Lee et al. | |
| 2017/0093918 A1 | 3/2017 | Banerjee et al. | |
| 2017/0147158 A1 | 5/2017 | Mukhopadhyay et al. | |
| 2018/0039441 A1 * | 2/2018 | Nimura | G06F 3/0656 |
| 2018/0089150 A1 | 3/2018 | Soni et al. | |
| 2019/0028743 A1 * | 1/2019 | He | H04N 21/2225 |
| 2019/0141128 A1 * | 5/2019 | Hallak | H04L 67/1097 |
| 2019/0174155 A1 * | 6/2019 | Colenbrander | H04N 21/47202 |
| 2019/0272123 A1 * | 9/2019 | Gissin | G06F 3/0659 |

FOREIGN PATENT DOCUMENTS

| | | |
|---|---|---|
| KR | 10-1402923 | 6/2014 |
| KR | 10-2015-0123678 | 11/2015 |
| WO | 2017/124083 A1 | 7/2017 |

OTHER PUBLICATIONS

Notice of Allowance dated Mar. 18, 2020, issued in U.S. Appl. No. 15/921,568, 14 pages.
U.S. Office Action dated Mar. 23, 2021, issued in U.S. Appl. No. 16/830,033 (17 pages).
U.S. Notice of Allowance dated Aug. 4, 2021, issued in U.S. Appl. No. 16/830,033 (9 pages).
U.S. Notice of Allowance dated Nov. 10, 2021, issued in U.S. Appl. No. 16/830,033 (8 pages).
Office Action dated Sep. 14, 2021, for related U.S. Appl. No. 16/904,448 (27 pages).
Office Action dated Jul. 25, 2019, for related U.S. Appl. No. 15/905,716 (8 pages).
Korean Notice Of Allowance dated Apr. 18, 2023, issued in corresponding Korean Patent Application No. 10-2018-0129636 (9 pages).
Chinese Office Action for CN Application No. 201811486808.X dated Nov. 24, 2023, 7 pages.
Ke, et al. "Research on Network Storage Technology," Computer and Peripherals, 2000, pp. 12-14 and 22 (in Chinese with English abstract).

* cited by examiner

500

| Cache Dev ID | Location | Domain |
|---|---|---|
| Cache Dev1 | 95134 | A |
| Cache Dev2 | 95136 | A |
| Cache Dev3 | 80202 | B |
| Cache Dev4 | 80202 | B |
| Cache Dev5 | 85004 | C |

| Cache Dev ID | Location | Content ID |
|---|---|---|
| Cache Dev1 | 95134 | C1 (S1-5) |
| Cache Dev2 | 95136 | C1 (S6-10) |
| Cache Dev3 | 80202 | C2 |
| Cache Dev3 | 80202 | C1 |
| Cache Dev4 | 80202 | C3 |

| Client ID | Content ID | Caching Dev ID |
|---|---|---|
| User 1 | Content 1 | Cache Dev3 |

| Client ID | Content ID | DL Timestamp | Use Timestamp | Use Count |
|---|---|---|---|---|
| User 1 | C1 | | | |
| User 1 | C3 | | | |
| User 2 | C1 | | | |
| User 3 | C2 | | | |
| User 4 | C3 | | | |

FIG. 5D

SYSTEM AND METHOD FOR DISTRIBUTED CACHING

CROSS-REFERENCE TO RELATED APPLICATION(S)

The present application is a continuation of U.S. patent application Ser. No. 16/904,448, filed Jun. 17, 2020, which is a continuation of U.S. patent application Ser. No. 15/921,568, filed Mar. 14, 2018, which claims priority to, and the benefit of, U.S. Provisional Patent Application No. 62/610,036, filed on Dec. 22, 2017, and U.S. Provisional Patent Application No. 62/609,948, filed on Dec. 22, 2017, the contents of all of which are incorporated by reference in their entirety herein.

BACKGROUND

1. Field

Some embodiments of the present disclosure relate generally to content caching using network-attached storage devices.

2. Description of the Related Art

Storage servers are utilized for a variety of data storage applications. In some applications a storage server may provide data storage to a number of remote clients. For example a storage server may store a database, media content, backup storage, etc. Media content delivery typically use storage servers located in datacenters spread around the world.

FIG. 1 depicts an example related art content delivery system.

Referring to FIG. 1, a datacenter 100 may be positioned with a connection to a backbone network 110 and a local network 120. Backbone networks are typically long-haul networks that span great distances and connect datacenters, servers, and user across cities, states, countries, and the world. The local network 120 usually span shorter distances, for example, connecting end users to data centers and the backbone networks 110. A datacenter 100 includes edge routers 130/135 which are used by the datacenter's servers to connect to both networks 110/120. For content delivery systems, a datacenter may include a content server 140 storing multimedia content 145 and a plurality of caching servers 150-156 for quickly distributing the content to end-user devices. For example, the content server 140 may store all of a content provider's content and may receive updates using the backbone network 110. The content server 140 may then distribute portions of the multimedia content to the caching servers 150-156. An end-user device may request the content via the local network 120 and retrieves the content from the appropriate caching server 150-156.

Current content delivery systems present multiple issues. They require lots of expensive hardware and consume high amounts of power and cooling. Furthermore, utilizing relatively few caching devices results in a performance bottleneck and leaves the system more vulnerable to hacking. Thus, a new system is desired.

The above information is only for enhancement of understanding of the background of embodiments of the present disclosure, and therefore may contain information that does not form the prior art.

SUMMARY

Some embodiments of the present disclosure provide a system and method for distributed caching. In various embodiments, the system includes at least one network-connected storage device, a content server, and a control server. In various embodiments, the control server is configured to discover the at least one network-connected storage device, collect device information from the at least one network-connected storage device, where the device information comprises a device location, assign each of the at least one network-connected storage device to a device domain based on each device location, and provide the content server with the device information for the one or more network-connected storage.

In various embodiments, the at least one network connected storage device comprises an Ethernet solid state drive (eSSD).

In various embodiments, the control server is further configured to generate a device table, wherein the device table comprises an entry for each of the discovered at least one network-connected storage device, the entry comprising: a cache device identifier, the device location, and the assigned device domain.

In various embodiments, the cache device identifier is an IP address.

In various embodiments, the content server is configured to push a content to each of the at least one network-connected storage device based on each device location.

In various embodiments, the content server has a cached content table, the cached content table having a content entry for each content stored on the at least one network-connected storage devices, wherein the content entry includes a cache device identifier and a content identifier.

In various embodiments, each of the at least one network-connected storage devices includes a hosted content table. In various embodiments, the hosted content table has an authorization entry for verifying a client device's access rights to each content stored on the network-connected storage device.

In various embodiments, a distributed caching system may include a plurality of network-connected storage devices. In various embodiments, the network-connected storage devices each include at least one content and a domain based on a device location. In various embodiments, the distributed caching system also includes a content server having a memory and a processor, wherein the processor is configured to execute instructions from the memory that, when executed by the processor, cause the processor to: verify an access right of a client to access a requested content; identify a location of the client; match the location of the client to a proximate domain; update a hosted content table of a device within the nearest domain to include an authorization entry for the client; deliver a redirect message to the client, wherein the redirect message comprises a caching device identifier.

In various embodiments, the at least one network connected storage device comprises an Ethernet solid state drive (eSSD).

In various embodiments, the instructions further cause the content server to verify the storage of the content within the nearest domain.

In various embodiments, the instructions further cause the content server to push a first shard of the requested content to a network-connected storage device in the nearest domain.

In various embodiments, the instructions further cause the content server to push an additional shard of the requested content to the network-connected storage device in the nearest domain.

In various embodiments, the device location is a physical location.

In various embodiments, the distributed caching system includes a plurality of Ethernet solid state drives (eSSDs) each having an IP address, a content server, and a control server. In various embodiments, the control server has a first memory and a first processor, wherein the first processor is configured to execute first instructions from the first memory that, when executed by the first processor, cause the first processor to: discover the each of the plurality of eSSDs; collect device information from each eSSD of the plurality of eSSDs, wherein the device information comprises a device location based on the IP address; and provide the content server with a list of the eSSDs and each corresponding device location.

In various embodiments, the instructions further cause the control server to generate a device table, having an entry for each of the plurality of eSSDs. In various embodiments, each entry has a cache device identifier, the device location, and the assigned device domain.

In various embodiments, the content server is configured to push a content to each of the at least one network-connected storage device based on each device location.

In various embodiments, the content server has a cached content table, the cached content table having a content entry for each content stored on the at least one network-connected storage devices. In various embodiments, the content entry has a cache device identifier and a content identifier.

In various embodiments, each of the at least one network-connected storage devices has a hosted content table. In various embodiments, the hosted content table includes an authorization entry for verifying a client device's access rights to each content stored on the network-connected storage device.

In various embodiments, the content server has a second memory and a second processor. In various embodiments, the second processor is configured to execute second instructions from the second memory that, when executed by the second processor, cause the second processor to: verify an access right of a client to access a requested content; identify a location of the client; match the location of the client to a nearest domain; update a hosted content table of an eSSD within the nearest domain to include an authorization entry for the client; deliver a redirect message to the client, wherein the redirect message comprises a caching device identifier.

In various embodiments, the second instructions further cause the content server to: verify the storage of the content within the nearest domain; and push the requested content to an eSSD in the nearest domain.

In various embodiments, a network-connected storage device has a network connection, a persistent memory storing at least one multimedia content, and a storage controller. In various embodiments, the storage controller has a memory storing a hosted content table that includes an authorization entry for the at least one multimedia content, and a processor, configured to execute instructions from the memory that, when executed by the processor, cause the processor to: verify an access right of a client to the a requested multimedia content according to the hosted content table; and deliver the requested multimedia content to the client via the network connection.

In various embodiments, the authorization entry includes a client ID, a content ID, a download timestamp, a use timestamp, and a use count.

In various embodiments, the at least one multimedia content is a first shard of a multimedia content.

In various embodiments, the network-connected storage device may request a second shard of the multimedia content from a content server according to the delivery of the first shard of the multimedia content.

In various embodiments, the network-connected storage device may notify a content server according to the delivery of the first shard of the multimedia content.

BRIEF DESCRIPTION OF THE DRAWINGS

Some embodiments can be understood in more detail from the following description taken in conjunction with the accompanying drawings, in which:

FIG. 5A depicts a Device Table for use on a control server in accordance with various embodiments;

FIG. 5B depicts a Cached Content Table for use by a content server in accordance with various embodiments;

FIG. 5C depicts a Redirect message that may be sent by the content server to a client device in accordance with various embodiments;

FIG. 5D depicts a Content Table for use on a network-connected storage device in accordance with various embodiments;

DETAILED DESCRIPTION

Figure 1:
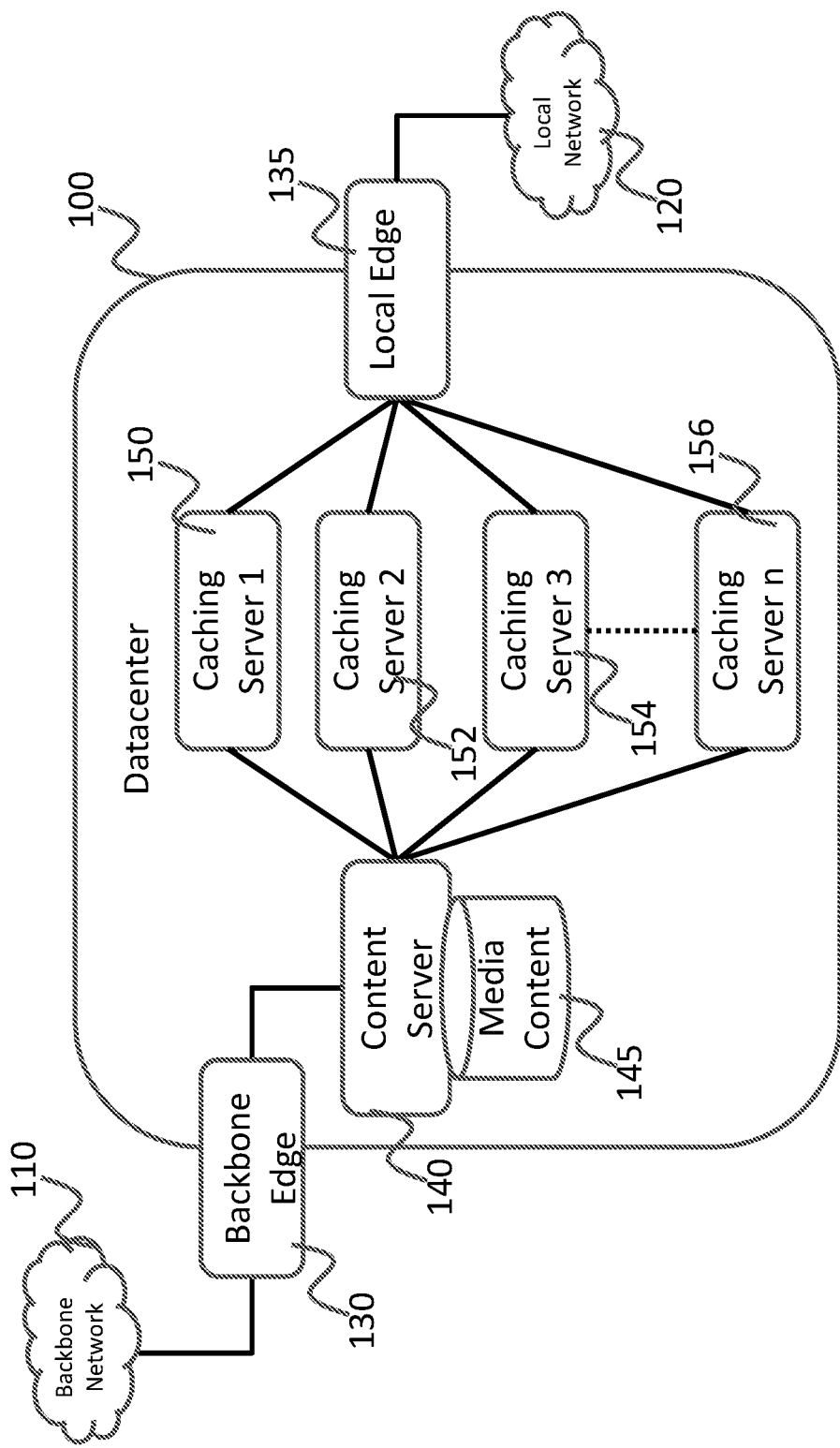
FIG. 1 depicts an example related art content delivery system.

Features of the inventive concept and methods of accomplishing the same may be understood more readily by reference to the following detailed description of embodiments and the accompanying drawings. Hereinafter, embodiments will be described in more detail with reference to the accompanying drawings, in which like reference numbers refer to like elements throughout. The present invention, however, may be embodied in various different forms, and should not be construed as being limited to only the illustrated embodiments herein. Rather, these embodiments are provided as examples so that this disclosure will be thorough and complete, and will fully convey the aspects and features of the present invention to those skilled in the art. Accordingly, processes, elements, and techniques that are not necessary to those having ordinary skill in the art for a complete understanding of the aspects and features of the present invention may not be described. Unless otherwise noted, like reference numerals denote like elements throughout the attached drawings and the written description, and thus, descriptions thereof will not be repeated. In the drawings, the relative sizes of elements, layers, and regions may be exaggerated for clarity.

In the following description, for the purposes of explanation, numerous specific details are set forth to provide a thorough understanding of various embodiments. It is apparent, however, that various embodiments may be practiced without these specific details or with one or more equivalent arrangements. In other instances, well-known structures and devices are shown in block diagram form in order to avoid unnecessarily obscuring various embodiments.

It will be understood that when an element, layer, region, or component is referred to as being "on," "connected to," or "coupled to" another element, layer, region, or component, it can be directly on, connected to, or coupled to the other element, layer, region, or component, or one or more intervening elements, layers, regions, or components may be present. However, "directly connected/directly coupled" refers to one component directly connecting or coupling another component without an intermediate component. Meanwhile, other expressions describing relationships between components such as "between," "immediately between" or "adjacent to" and "directly adjacent to" may be construed similarly. In addition, it will also be understood that when an element or layer is referred to as being "between" two elements or layers, it can be the only element or layer between the two elements or layers, or one or more intervening elements or layers may also be present.

The terminology used herein is for the purpose of describing particular embodiments only and is not intended to be limiting of the present invention. As used herein, the singular forms "a" and "an" are intended to include the plural forms as well, unless the context clearly indicates otherwise. It will be further understood that the terms "comprises," "comprising," "have," "having," "includes," and "including," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

As used herein, the term "substantially," "about," "approximately," and similar terms are used as terms of approximation and not as terms of degree, and are intended to account for the inherent deviations in measured or calculated values that would be recognized by those of ordinary skill in the art. "About" or "approximately," as used herein, is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within ±30%, 20%, 10%, 5% of the stated value. Further, the use of "may" when describing embodiments of the present invention refers to "one or more embodiments of the present invention." As used herein, the terms "use," "using," and "used" may be considered synonymous with the terms "utilize," "utilizing," and "utilized," respectively. Also, the term "exemplary" is intended to refer to an example or illustration.

When a certain embodiment may be implemented differently, a specific process order may be performed differently from the described order. For example, two consecutively described processes may be performed substantially at the same time or performed in an order opposite to the described order.

Various embodiments are described herein with reference to sectional illustrations that are schematic illustrations of embodiments and/or intermediate structures. As such, variations from the shapes of the illustrations as a result, for example, of manufacturing techniques and/or tolerances, are to be expected. Further, specific structural or functional descriptions disclosed herein are merely illustrative for the purpose of describing embodiments according to the concept of the present disclosure. Thus, embodiments disclosed herein should not be construed as limited to the particular illustrated shapes of regions, but are to include deviations in shapes that result from, for instance, manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the drawings are schematic in nature and their shapes are not intended to illustrate the actual shape of a region of a device and are not intended to be limiting.

The electronic or electric devices and/or any other relevant devices or components according to embodiments of the present invention described herein may be implemented utilizing any suitable hardware, firmware (e.g. an application-specific integrated circuit), software, or a combination of software, firmware, and hardware. For example, the various components of these devices may be formed on one integrated circuit (IC) chip or on separate IC chips. Further, the various components of these devices may be implemented on a flexible printed circuit film, a tape carrier package (TCP), a printed circuit board (PCB), or formed on one substrate. Further, the various components of these devices may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the spirit and scope of the exemplary embodiments of the present invention.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

Embodiments of the present invention include a system and method for distributed caching using network-attached storage devices. In various embodiments, the system includes one or more network-attached storage devices such as Ethernet SSDs (eSSDs) or other network-attached micro devices. The network-attached storage devices may be distributed in a datacenter or throughout a local network. A control server is utilized to configure the network-attached storage devices as caching devices. The caching devices may then be used as part of a multimedia content delivery system, where the caching devices operate in conjunction with a content server to server multimedia or other content to users.

Figure 2:
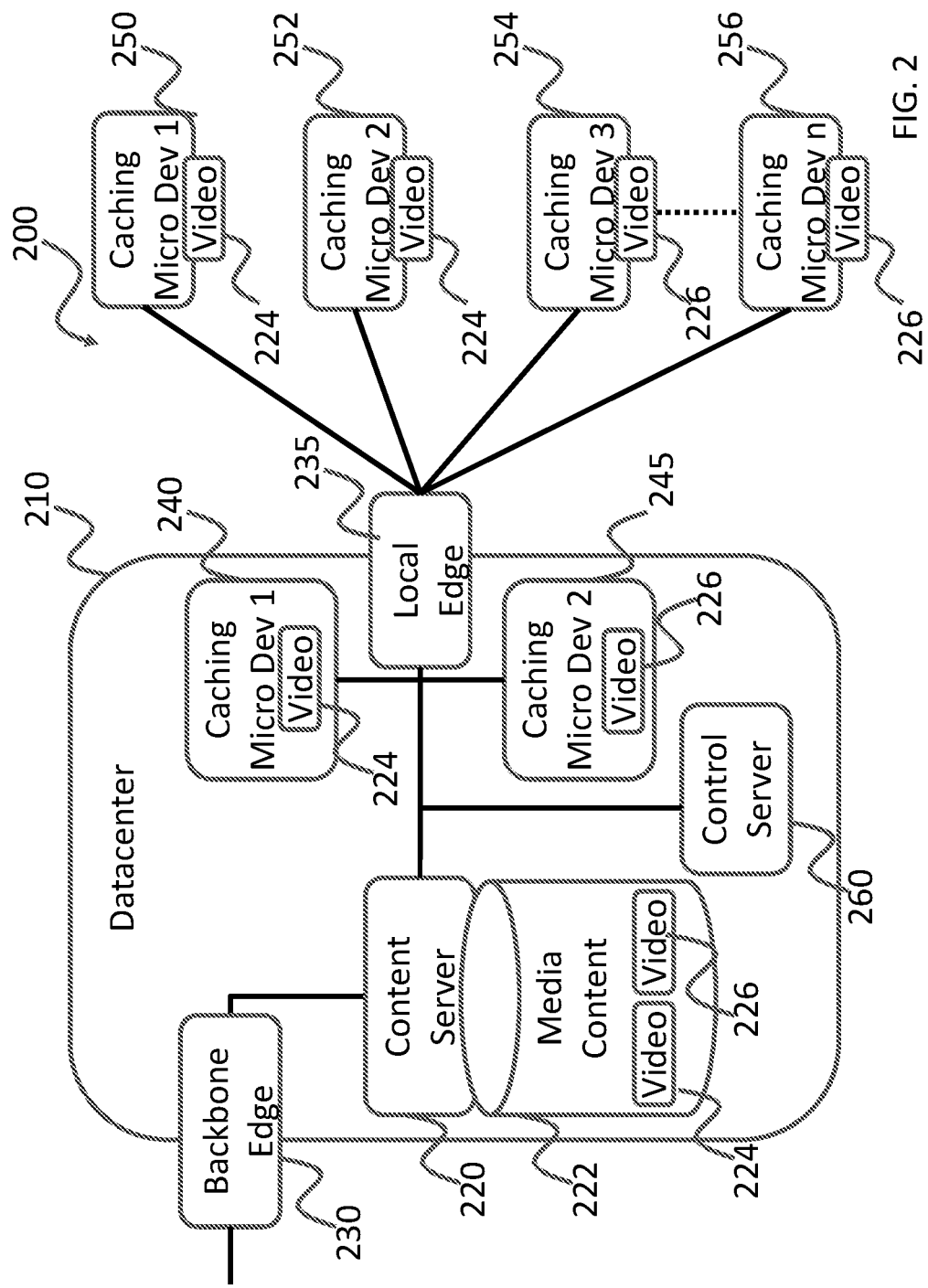
FIG. 2 depicts a distributed caching system in accordance with various embodiments of the present invention.

FIG. 2 depicts a distributed caching system in accordance with various embodiments of the present invention.

Referring, to FIG. 2, in various embodiments, the distributed caching system 200 may be configured to provide storage services using a plurality of caching network-connected storage devices. For example, the distributed caching system 200 may include various components located in a datacenter 210. The datacenter 210 may be connected to a backbone network via a backbone edge router 230 and be connected to a local network via a network edge router 235. In various embodiments, the datacenter 210 includes a content server 220 configured to store multimedia content 222. The multimedia content 222 may include, for example, video, audio, and other multimedia files. For example, in various embodiments, the multimedia content 222 may include a first video 224 and a second video 226. In various embodiments, the datacenter 210 includes one or more datacenter caching network-connected storage devices 240, 245. Similarly, in various embodiments, one or more local caching network-connected storage devices 250-256 may be located on a local network. In various embodiments, the caching network-connected storage devices may include micro devices such as eSSDs. For example, in various embodiments, the eSSDs include a storage controller having a processor, memory (e.g. DRAM), persistent memory (e.g. firmware) and a network connection, and persistent memory (e.g. flash memory). The eSSDs are configured to perform Input/Output operations with remote hosts via the network connection. In various embodiments, the caching network-connected storage devices may be configured to store a portion of the media content 222 and provide access to their stored media content to one or more client devices.

For example, in various embodiments, the first video 224 may be stored on the datacenter caching network connected storage device 240 and the second video 226 may be stored on the datacenter caching network connected storage device 245. Client devices may retrieve the first and second videos 224, 226 from the datacenter caching network-connected storage devices 240, 245. In some embodiments, all or a portion of the media content 240, 245 may be stored in the local caching network-connected storage devices 250-256. For example, in various embodiments the first video 224 may be stored on the local caching network-connected storage devices 250 and 252, while the second video 226 may be stored on the local caching network-connected storage devices 254 and 256. In various embodiments, the datacenter and local caching network-connected storage devices may store a portion of the first and second videos 224,226. For example, the local caching network-connected storage device 250 may store a first portion of the first video 224, the local caching network-connected storage device 252 may store a second portion of the first video 224, and the datacenter caching network-connected storage device 250 may store a third portion of the first video 224. As will be discussed below, the multimedia content 222 may be stored in a variety of ways across multiple caching network-attached storage devices.

In various embodiments, a control server 260 may be configured for performing administrative functions on the various caching network-connected devices 240, 245, 250-256. For example, the control server 260 may be located in the datacenter 210 and able to communicate with each of the caching network-connected devices, while in other embodiments, the control server 260 may be located on the local network or connected to the backbone network. In various embodiments, the administrative functions may include an initialization of the caching network-connected devices (as will be described in detail below) and subsequent modifications to that setup.

Figure 3:
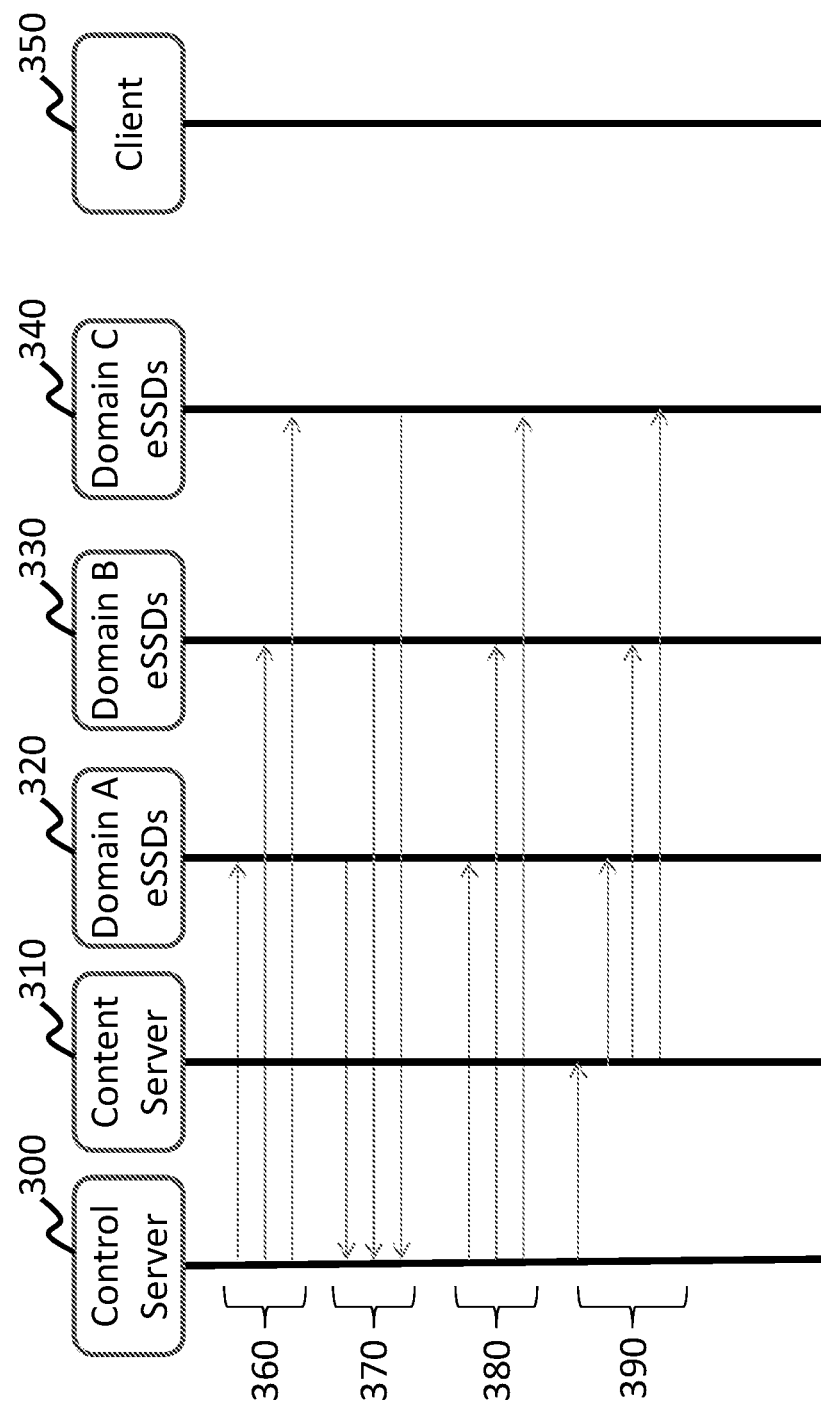
FIG. 3 depicts a communications chart for initializing the distributed caching system according to various embodiments of the present invention.
Figure 4:
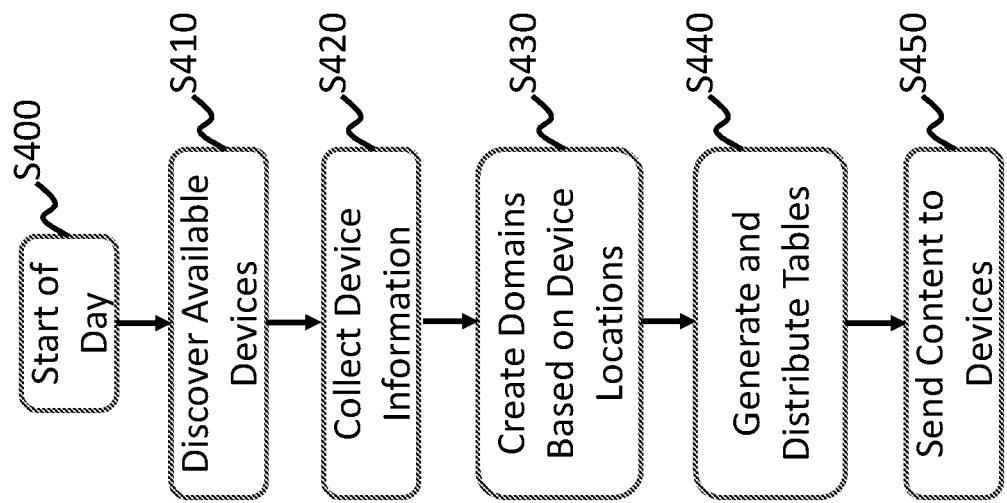
FIG. 4 depicts a method for system initialization according to various embodiments of the present invention.

FIG. 3 depicts a communications chart for initializing the distributed caching system according to various embodiments of the present invention. FIG. 4 depicts a method for system initialization according to various embodiments of the present invention.

Referring to FIGS. 3 and 4, in various embodiments, the control server 300 may configure the attached caching network-connected devices 320, 330, 340 for use with the content server 310 for the distribution of multimedia content to client devices 350. In various embodiments, the initialization may begin at a "Start of Day" (S400). In various embodiments, a "Start of Day" may occur when the distributed caching system is initially setup or when new caching network-connected storage devices 320, 330, 340 are added to the distributed caching system.

In various embodiments, at the "Start of Day" the control server 300 will discover each available caching network-connected storage device 320-340. For example, in various embodiments, the control server 300 sends discovery packets (360) to IP addresses potentially having a caching network-connected storage device. For example, the control server 300 may ping the IP addresses of the network-connected storage devices. In various embodiments, the network-connected storage devices 320, 330, 340 may respond to the control server 300 when they are available (370).

In various embodiments, the responses by the network-connected storage devices 320, 330, 340 may include device information (S420). For example, the device information may include the network-connected storage device's identifier (e.g. an IP or MAC address), a device's physical location (e.g. a geographic location), and the device's performance characteristics (e.g. available storage space, total storage space, network bandwidth, etc.).

In various embodiments, the control server 300 may utilize the device information to create caching domains (S430). For example, in various embodiments, the control server 300 may create caching domains that include devices in relatively close geographic locations. For example, the network-connected storage device 320 may be representative of multiple network-connected storage devices all located in the relative same geographic area (e.g. the same city). Similarly, the network-connected storage devices 330 and 340 may each be representative of multiple network-connected storage devices all located in the relative same geographic areas.

In various embodiments, the control server 300 may generate a device table (e.g. the device table depicted in FIG. 5A which will be described below) that includes each of the discovered network-connected storage devices 320, 330, 340 and updates 380 each of the network-connected storage devices' content tables (e.g. the content table depicted in FIG. 5D which will be described below) to include the control server 300 (S440). In various embodiments, the control server 300 may provide a table that includes the available network-connected storage devices (e.g. the cached content table depicted in FIG. 5B which will be described below) to the content server 310 and the content server 310 may start distributing content to the network-connected storage devices 320, 330, 340 (390) (S450).

FIG. 5A depicts a Device Table for use on a control server in accordance with various embodiments. FIG. 5B depicts a Cached Content Table for use by a content server in accordance with various embodiments. FIG. 5C depicts a Redirect message that may be sent by the content server to a client device in accordance with various embodiments. FIG. 5D depicts a Content Table for use on a network-connected storage device in accordance with various embodiments.

Referring to FIG. 5A, in various embodiments, the control server may generate and maintain a device table 500. In various embodiments, the device table 500 is configured to list each of the caching devices that are usable by the caching system and includes their locations and a domain. The device table 500 may be initially generated upon a "Start of Day" (e.g. system initialization) and may also be updated by the control server as caching network-connected storage devices are added and removed from the caching system. In various embodiments, the device table 500 includes a caching device identification 502, a device location 504, and a domain 506. In various embodiments, the device identification may include a unique identifier for a caching network-connected storage device. For example, in various embodiments, the device identification may include an IP address for the device. In various embodiments, the device location 504 identifies the actual geographic location of the device. For example, in various embodiments, the device location 504 may include a postal zip code. In other embodiments, the device location 504 may include a longitude and latitude of the device. In various embodiments, the device domain 506 is a group that the control server has added the device to. For example, devices having the same or similar device locations may be grouped in the same domain. In various embodiments, the device table 500 includes a device entry 508-516 for each device under the control of the control server.

Referring to FIG. 5B, in various embodiments, the content server may be configured with a cached content table 518. In various embodiments, the cached content table 518 is configured to provide the content server with a list of the caching network-connected storage devices, their locations, and a listing of what content is stored on each device. For example, in various embodiments, the cached content table 518 may include a cache device identifier 520, a location 522, and a content identifier 524. The cache device identifier 520 and location 522 may correspond to the cache device identifier 502 and device location 504 described above. In various embodiments, the content identifier 522 includes a unique identifier of a content (e.g. a multimedia content). For example, the content identifier 524 may include a movie title. In various embodiments, the cache device may store only a portion of a complete content (e.g. a portion of a video) and the content identifier 524 may also identify which portion of the content is stored in the caching device. For example, the cache content table 518 includes device entries 526-534. In this example, a first caching device 526 is located in zip code 95134 (e.g. San Jose, California, USA), and is storing shards 1 through 5 of content 1 (e.g. the first five portions of content 1). A second caching device 528 is located in zip code 95136 (e.g. San Jose, California, USA), and is storing shards 6 through 10 of content 1 (e.g. the final five portions of content 1). In various embodiments, the cached content table 518 may include an entry for each content (e.g. each device may have multiple listings if the device stores more than one content, such as device 3 which includes entries 530 and 532). In various other embodiments, the cached content table 518 may include a single entry for each caching device and list all of the content stored on the device in the content ID 524.

In various embodiments, the cached content table 518 may be generated and maintained by the content server in conjunction with the control server. For example, in various embodiments, the control server may generate the cached content table and populate it with each of the devices being used for caching. In other embodiments, the content server may generate the cached content table 516 and may receive, from the control server, a list of the devices.

Referring to FIG. 5C, in various embodiments, a redirect message 536 may be sent by the content server to a client to direct the client to a device storing a requested data. For example, in various embodiments, the redirect message 536 includes a client identifier 538, a content identifier 540, and a caching device identifier 542. In various embodiments, the client identifier 538 is a unique identifier for the client. For example, the client identifier 538 may be an IP address. In other examples, the client identifier 538 may include a client username or a security token associated with the client. In various embodiments, the content identifier 540 includes a unique identifier of a content and may correspond to the content identifier 524. In various embodiments, the caching device identifier 542 may correspond to the cache device identifier 502 and 520. For example, as stated above, the caching device identifiers 502, 520, 542 may include an IP address for a caching device.

Referring to FIG. 5D, in various embodiments, each of the caching network-connected storage devices may include a hosted content table 544. In various embodiments, the hosted content table 544 is stored on the network-connected storage device in persistent memory, such as in a device controller in a firmware or in main storage (e.g. flash). In various embodiments, the hosted content table 544 includes an authorization entry for each client that has or has previously downloaded content from the device (entries 556-564). For example, the hosted content table 544 may include entries having a client identifier 546, a content identifier 548, a download timestamp 550, a use timestamp 552, and use count 554. In various embodiments, the client identifier 546 may correspond to the client identifier 538 described above. In various embodiments, the content identifier 548 may be the same content identifier as the content identifier 524 and 540. In various embodiments, the download timestamp 550 may be a timestamp for when the content was downloaded from a content server. For example, in some embodiments, the device may be configured to remove a content after it has become older than a predefined threshold. In various embodiments, the use timestamp 552 includes a timestamp when the client downloaded the content. In various embodiments, the use count 554 may include a total number of views of the content by the client.

Figure 6:
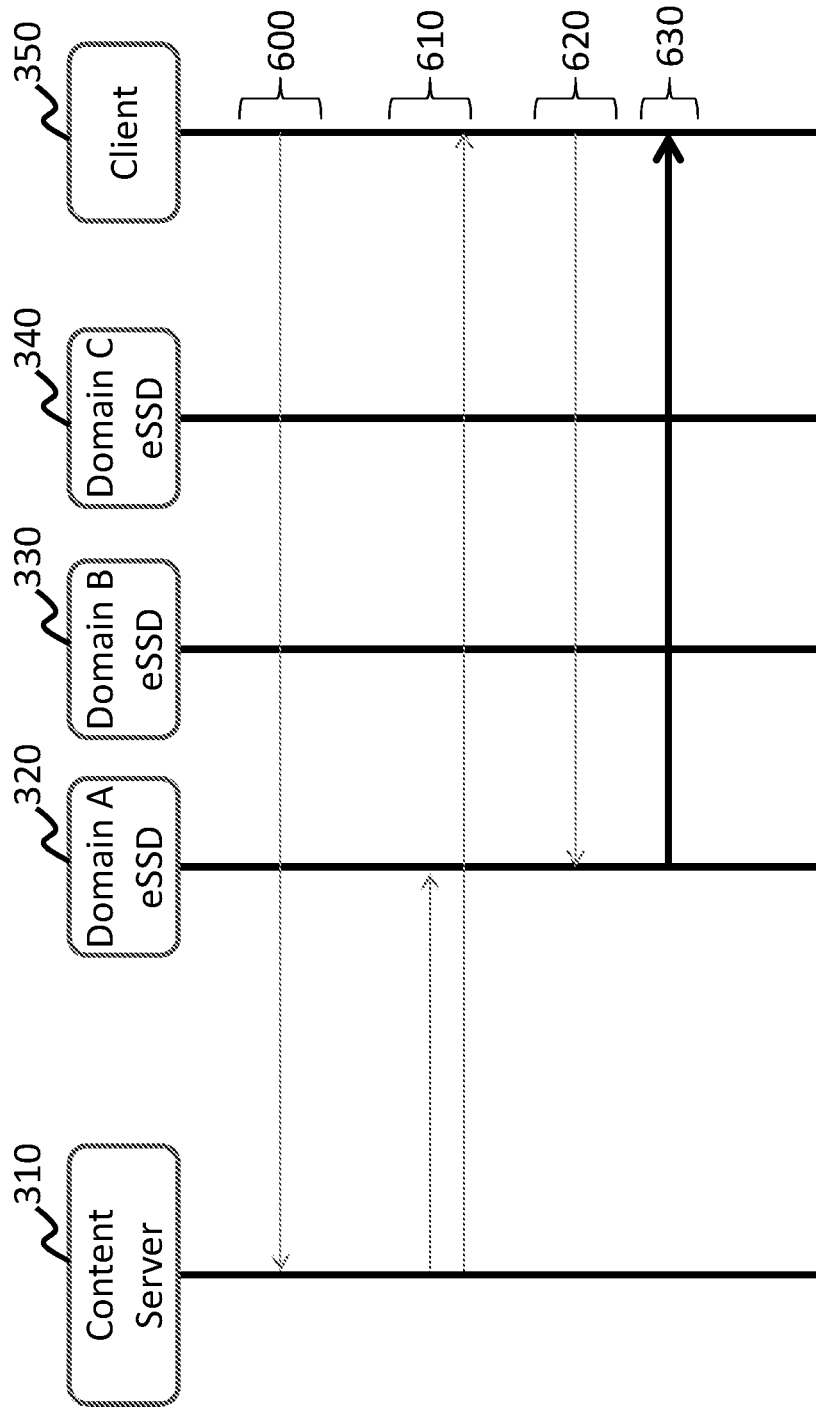
FIG. 6 depicts a communications chart for utilizing the distributed caching system to download a content according to various embodiments of the present invention.
Figure 7:
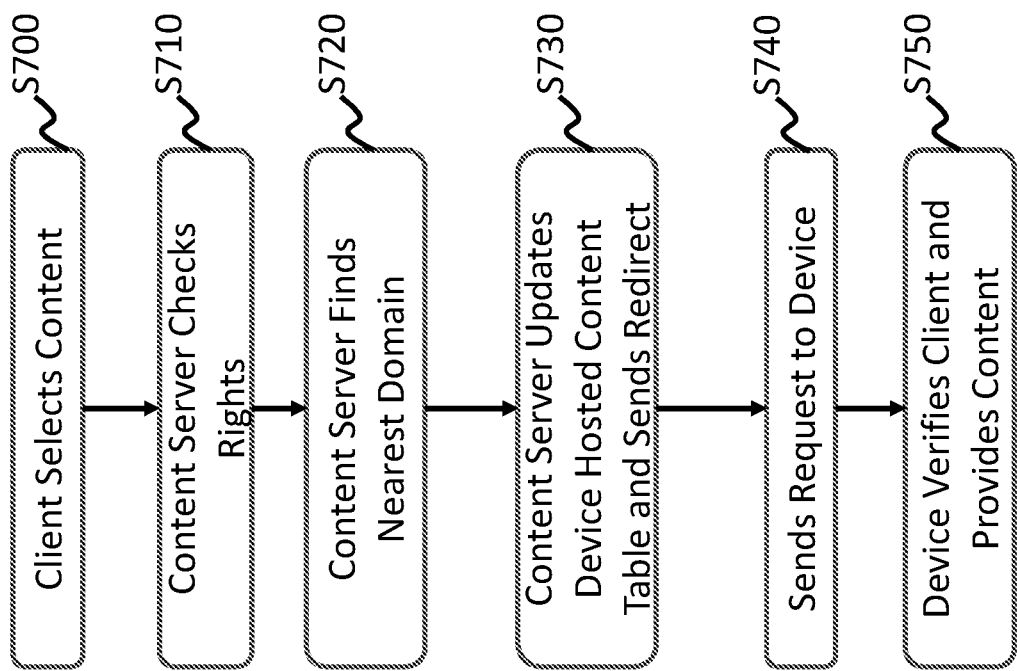
FIG. 7 depicts a method for downloading a content utilizing the distributed caching system according to various embodiments of the present invention.

FIG. 6 depicts a communications chart for utilizing the distributed caching system to download a content according to various embodiments of the present invention. FIG. 7 depicts a method for downloading a content utilizing the distributed caching system according to various embodiments of the present invention.

Referring to FIGS. 6 and 7, in various embodiments, the distributed caching system may distribute content utilizing the content server in conjunction with the caching network-connected storage devices and without further intervention from the control server. In various embodiments, the caching network-connected storage devices include a first group of one or more eSSDs 320 located in a first location and assigned to "Domain A", a second group of one or more SSDs 330 located in a second location and assigned to "Domain B", and a third group of one or more eSSDs 340 located in a first location and assigned to "Domain C".

In various embodiments, a client 350 may send a request 600 to access a content from the content server 310 (S700). In various embodiments, the content server 310 may check the client's access rights to the content (S710). For example, the request may include a username and password for the client (or other user account identifying information) to verify the identity of the user and compare the user's identity to access rights to the content. In various embodiments, the content server 310 may identify the location of the client device 350 and identify a domain having caching devices that are relatively near the client device 350 (S720). For example, the content server 310 may use the client's 350 IP address to identify the location of the client 350 and then match the client 350 to the closest caching devices using the cache content table to identify which devices have the requested content and where those devices are located.

In various embodiments, the content server 310 may provide an authorization update 610 the caching device 320 and the client 350 so that the client 350 may access the requested content from the caching device 320. For example, in various embodiments, the content server 310 may provide the identified caching device 320 with an update to the device's hosted content table (e.g. the hosted content table of FIG. 5D) to allow for the client device 350 to access the caching device 320 and may send the client device 350 a redirect message (e.g. the redirect message of FIG. 5C) (S730).

In various embodiments, the client 350 receives the redirect message from the content server 310 and uses the information provided in the redirect message to request 620 the content from the caching device 320 (S740). In various embodiments, the caching device 320 will receive the request from the client 350 and the caching device will verify that the client 350 has authority to access the content by checking the device's hosted content table (e.g. the hosted content table of FIG. 5D). Once the client 350 has been verified the caching device 320 provides the content 630 (S750).

Figure 8:
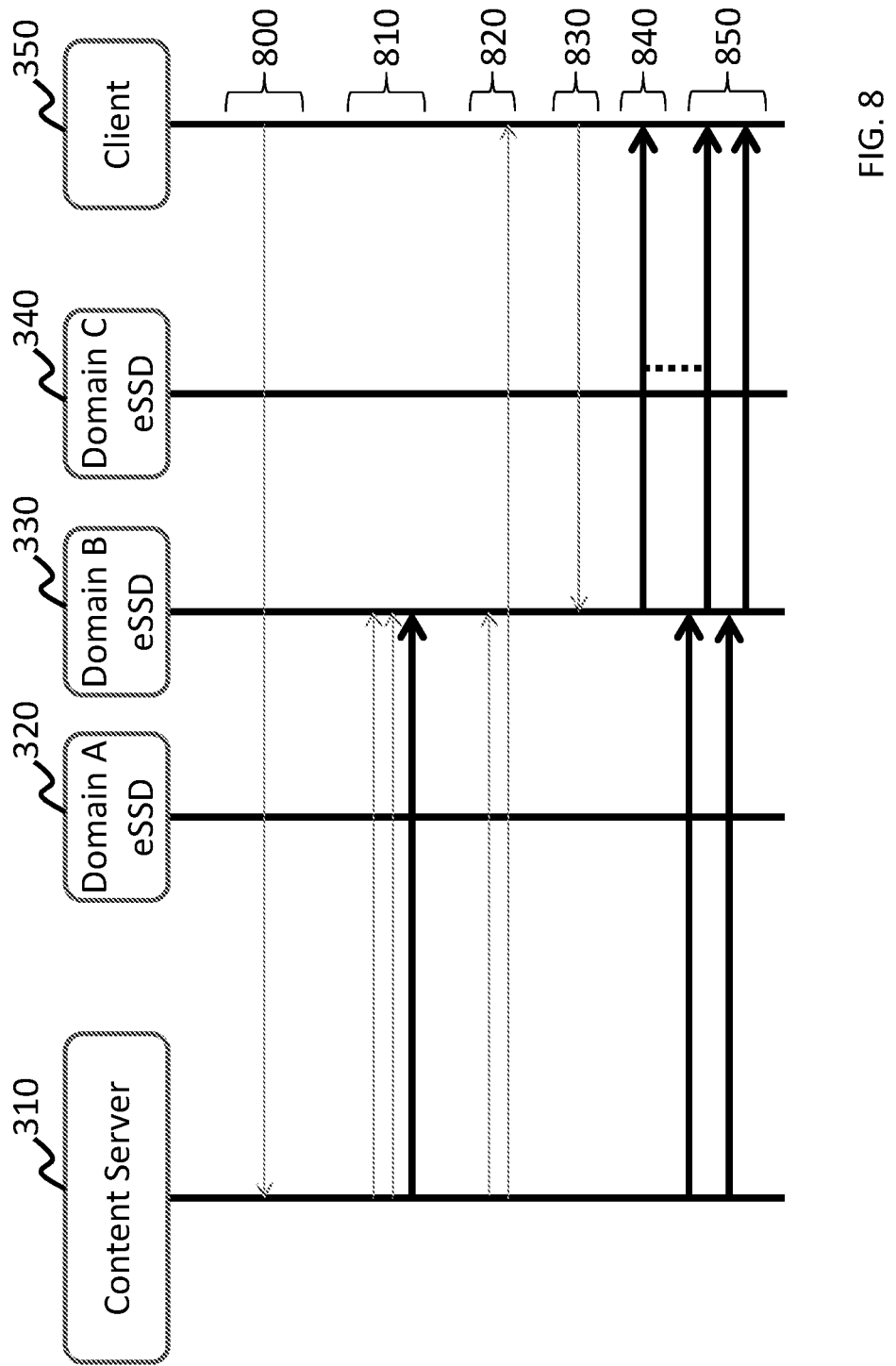
FIG. 8 depicts a communications chart for utilizing the distributed caching system to download a content when the content is not currently available on a local caching device according to various embodiments of the present invention.
Figure 9:
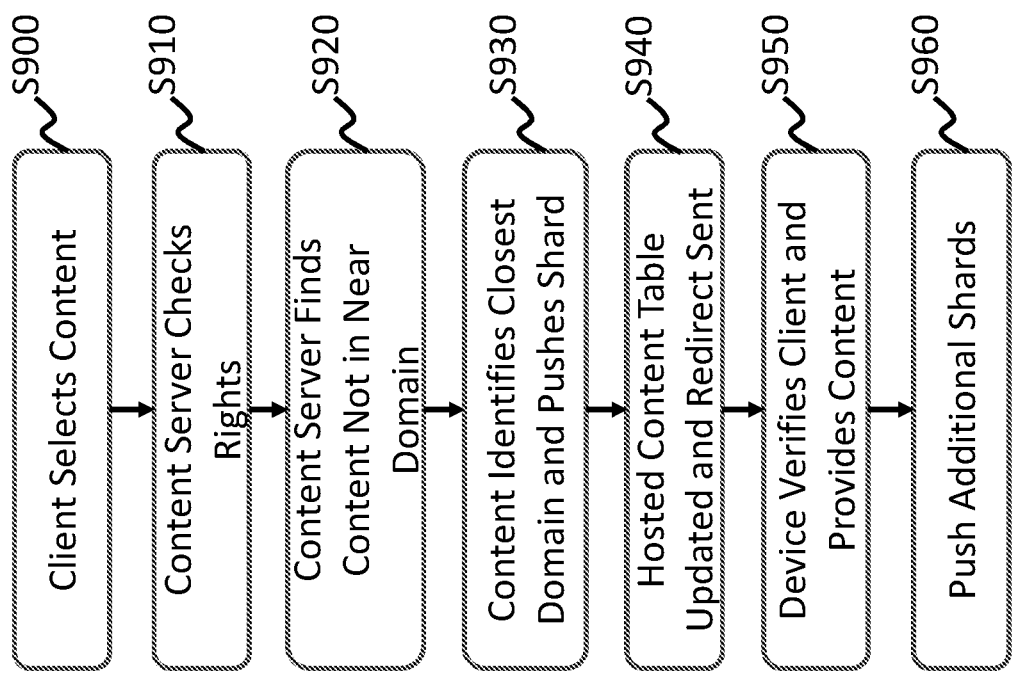
FIG. 9 depicts a method for downloading a content utilizing the distributed caching system when the content is not currently available on a local caching device according to various embodiments of the present invention.

FIG. 8 depicts a communications chart for utilizing the distributed caching system to download a content when the content is not currently available on a local caching device according to various embodiments of the present invention. FIG. 9 depicts a method for downloading a content utilizing the distributed caching system when the content is not currently available on a local caching device according to various embodiments of the present invention.

Referring to FIGS. 8 and 9, in various embodiments, the distributed caching system may distribute content utilizing the content server in conjunction with the caching network-connected storage devices and without further intervention from the control server even when a local caching device does not have the content stored on the device.

In various embodiments, a client 350 may send a request 800 to access a content from the content server 310 (S900). In various embodiments, the content server 310 may check the client's access rights to the content (S910). As described above, in various embodiments, the request may include a username and password for the client (or other user account identifying information) to verify the identity of the user and compare the user's identity to access rights to the content. In various embodiments, the content server 310 may identify the location of the client device 350 and identify a domain having caching devices that are relatively near the client device 350 (e.g. physically or logically). In some instances, the closest domain (e.g. a proximate domain) may not include any devices that are hosting the requested content (S920). For example, the caching devices 330 in "Domain B" may be the closest caching devices to the client 350, but may not currently include the requested content. In various embodiments, the content server 310 identifies the closest domain to the client 350 and pushes 810 the content or a first shard of the content to a caching device in the identified domain (S930). In various embodiments, the cached content table (e.g. the cached content table of FIG. 5B) may be updated to reflect the newly cached content. In various embodiments, the content server 310 may provide the identified caching device 330 with an update to the device's hosted content table (e.g. add an authorization entry to the hosted content table of FIG. 5D) to allow for the client device 350 to access the caching device 330 and may send the client device 350 a redirect message (e.g. the redirect message of FIG. 5C) 820 (S940).

For example, the content server 310 may use the client's 350 IP address to identify the location of the client 350 and then match the client 350 to the closest caching devices (e.g. a proximate caching device) using the cache content table to identify which devices have the requested content and where those devices are located. In various embodiments, the client 350 receives the redirect message from the content server 310 and uses the information provided in the redirect message to request 830 the content from the caching device 320 and, after verifying that the client 350 has authority to access the content by checking the device's hosted content table (e.g. the hosted content table of FIG. 5D), the caching device 330 provides the content 840 (S950).

In various embodiments, the content server 310 may send 850 the caching devices 330 with shards as the client device 350 requires them (S960). For example, in various embodiments the requested content may include a video file. The video file may be split into a plurality of shards. The plurality of shards may be of a uniform or non-uniform size. For example, a first shard may include the first 3 minutes of a video and each subsequent shard may include the next 10 minutes of video. In various embodiments, as the client plays the video, the caching devices 330 may notify the content server 310 when additional shards are needed (e.g. when the client will soon complete the download of the current shard) and the content server 310 may push additional shards 850 to the caching device(s) 330 being utilized (and update the cached content table as necessary). In various embodiments, the shards may be pushed to different caching devices within the same domain. In these cases, the content server 310 may be configured to send redirect messages as necessary to properly direct the client device to the caching devices with the requested content. Additionally, the content server 310 may also update the hosted content tables of the caching devices so that the client will be able to access their stored content.

Accordingly, the above described embodiments of the present disclosure provide a system and method for a distributed caching system.

The foregoing is illustrative of example embodiments, and is not to be construed as limiting thereof. Although a few example embodiments have been described, those skilled in the art will readily appreciate that many modifications are possible in the example embodiments without materially departing from the novel teachings and advantages of example embodiments. Accordingly, all such modifications are intended to be included within the scope of example embodiments as defined in the claims. In the claims, means-plus-function clauses are intended to cover the structures described herein as performing the recited function and not only structural equivalents but also equivalent structures. Therefore, it is to be understood that the foregoing is illustrative of example embodiments and is not to be construed as limited to the specific embodiments disclosed, and that modifications to the disclosed example embodiments, as well as other example embodiments, are intended to be included within the scope of the appended claims. The inventive concept is defined by the following claims, with equivalents of the claims to be included therein.

What is claimed is:

1. A system comprising:
a solid state drive (SSD) having an identifier comprising a network protocol address;
a content device; and
a control device, the control device comprising:
a memory; and
a processor configured to execute instructions from the memory that, when executed by the processor, cause the processor to:
discover the SSD;
collect device information from the SSD, wherein the device information comprises a device location based on the network protocol address and one or more of an available storage space, a total storage space, or network bandwidth of the SSD; and
provide the content device with the device information for the SSD,
wherein the content device is configured to transmit content to the SSD based on the device information, the content device comprising information of contents stored in the SSD,
wherein the information of contents stored in the SSD comprise a device identifier and access information, and
wherein the SSD changes a content stored in the SSD from a first state to a second state based on a storage threshold condition.

2. The system of claim 1, wherein the SSD comprises an Ethernet SSD (eSSD) and the network protocol address comprises an internet protocol (IP) address.

3. The system of claim 1, wherein the instructions further comprising generating a device table, wherein the device table comprises an entry for the SSD, the entry comprising at least one of a cache device identifier, the device location, or a device domain.

4. The system of claim 3, wherein the cache device identifier comprises an IP address.

5. The system of claim 1, wherein the processor is further configured to assign the SSD to a device domain based on the device information.

6. The system of claim 1, wherein the content device comprises a cached content table comprising the information of contents stored in the SSD, the cached content table further comprising a content entry for the content stored on the SSD, wherein the content entry comprises at least one of a cache device identifier or a content identifier.

7. The system of claim 6, wherein the SSD comprises a hosted content table, wherein the hosted content table comprises an authorization entry for verifying a client device's access rights to the content stored on the SSD.

8. A system comprising:
a solid state drive (SSD) comprising at least one content and a domain based on a device information, the SSD having an identifier comprising a network protocol address; and
a content device, the content device comprising:
a memory; and
a processor configured to execute instructions from the memory that, when executed by the processor, cause the processor to:
verify an access right of a client to access a requested content;
identify information of the client;
match the information of the client to a proximate domain;
update a hosted content table of the SSD within a nearest domain; and
deliver a redirect message to the client, wherein the device information comprises a device location based on the network protocol address and one or more of an available storage space, a total storage space, or network bandwidth of the SSD, and
wherein the content device comprises information of contents stored in the SSD,
wherein the information of contents stored in the SSD comprise a device identifier and access information, and
wherein the SSD changes a content stored in the SSD from a first state to a second state based on a storage threshold condition.

9. The system of claim 8, wherein the SSD comprises an Ethernet SSD (eSSD) and the network protocol address comprises an internet protocol (IP) address.

10. The system of claim 8, the instructions further comprising:
verifying storage of the content within the nearest domain, wherein the information of the client comprises a location of the client, wherein updating the hosted content table of the SSD comprises including an authorization entry for the client, and wherein the redirect message comprises a caching device identifier.

11. The system of claim 10, the instructions further comprising:
transmitting a first shard of the requested content to the SSD in the nearest domain.

12. The system of claim 11, the instructions further comprising:
transmitting a second shard of the requested content to the SSD in the nearest domain.

13. The system of claim 8, wherein the device information comprises the device location, the device location comprising a physical location.

14. A system comprising:
a solid state drive (SSD) having an identifier comprising a network protocol address;
a content device; and
a control device, the control device comprising:
a first memory; and
a first processor configured to execute first instructions from the first memory that, when executed by the first processor, cause the first processor to:
discover the SSD;
collect device information from the SSD, wherein the device information comprises a device location based on the network protocol address and one or more of an available storage space, a total storage space, or network bandwidth of the SSD; and provide the content device with the identifier and the device information of the SSD, wherein the content device comprises information of contents stored in the SSD, wherein the information of contents stored in the SSD comprise a device identifier and access information, and wherein the SSD changes a content stored in the SSD from a first state to a second state based on a storage threshold condition.

15. The system of claim 14, wherein the SSD comprises an Ethernet SSD (eSSD) and the network protocol address comprises an internet protocol (IP) address, wherein the content device is configured to transmit content to the eSSD based on the device location.

16. The system of claim 14, wherein the content device comprises a cached content table comprising the information of contents stored in the SSD and a content entry for content stored on the SSD device, wherein the content entry comprises a cache device identifier and a content identifier, and wherein the SSD comprises a hosted content table to verify a client device's access rights to the content.

17. The system of claim 14, wherein the content device comprises:
a second memory; and
a second processor configured to execute second instructions from the second memory that, when executed by the second processor, cause the second processor to:
verify an access right of a client to access a requested content;
identify a location of the client;
match the location of the client to a nearest domain;
update a hosted content table of the SSD within the nearest domain to include an authorization entry for the client;
deliver a redirect message to the client, wherein the redirect message comprises a caching device identifier;
verify storage of the requested content within the nearest domain; and
transmit the requested content to the SSD in the nearest domain.

18. A solid state drive (SSD) comprising:
a network connection;
a persistent memory storing at least one multimedia content comprising a first shard of multimedia content; and
a controller comprising:
a memory storing a hosted content table, wherein the hosted content table comprises an authorization entry for the at least one multimedia content; and
a processor, wherein the processor is configured to execute instructions from the memory that, when executed by the processor, cause the processor to:
verify an access right of a client to a requested multimedia content according to the hosted content table; and
deliver the requested multimedia content to the client via the network connection, wherein an identifier of the SSD comprises a network protocol address, wherein a device information of the SSD comprises a device location based on the network protocol address and one or more of an available storage space, a total storage space, or network bandwidth of the SSD,
wherein a content device in communication with the SSD comprises information of contents stored in the SSD,
wherein the information of contents stored in the SSD comprise a device identifier and access information, and
wherein the SSD changes a content stored in the SSD from a first state to a second state based on a storage threshold condition.

19. The SSD of claim 18, wherein the network protocol address comprises an internet protocol (IP) address, and wherein the authorization entry comprises at least one of a client ID, a content ID, a download timestamp, a use timestamp, or a use count.

20. The SSD of claim 18, wherein the instructions further cause the processor to:
request a second shard of the multimedia content from the content device according to a delivery of the first shard of the multimedia content; and
notify the content device according to the delivery of the first shard of the multimedia content.

* * * * *